United States Patent [19]

Dreyer

[11] Patent Number: 4,480,948
[45] Date of Patent: Nov. 6, 1984

[54] MACHINE FOR APPLYING PELLETS AND POWDER

[75] Inventor: Heinz Dreyer, Hasbergen-Gaste, Fed. Rep. of Germany

[73] Assignee: Amazonen-Werke H. Dreyer GmbH & Co. KG, Hasbergen-Gaste, Fed. Rep. of Germany

[21] Appl. No.: 400,209

[22] Filed: Jul. 21, 1982

[30] Foreign Application Priority Data

Jul. 24, 1981 [DE] Fed. Rep. of Germany ....... 3129235

[51] Int. Cl.³ .............................................. B65G 53/46
[52] U.S. Cl. .................................... 406/52; 222/148; 222/342; 222/414
[58] Field of Search ..................... 406/128, 129, 52; 222/148, 345, 349, 350, 351, 313, 312, 315, 623, 223, 342, 368, 414; 239/654, 655

[56] References Cited

U.S. PATENT DOCUMENTS

| Re. 3,587 | 8/1869 | Fostex | 222/342 |
| 11,485 | 4/1895 | Block | 222/349 |
| 1,515,987 | 11/1924 | Allison | 222/623 |
| 3,606,965 | 9/1971 | Cortelyon et al. | 222/368 |

FOREIGN PATENT DOCUMENTS

| 2208834 | 9/1972 | Fed. Rep. of Germany . |
| 2507025 | 9/1976 | Fed. Rep. of Germany . |
| 2729562 | 1/1979 | Fed. Rep. of Germany . |
| 2924625 | 1/1981 | Fed. Rep. of Germany . |
| 53-69362 | 6/1978 | Japan | 222/368 |

Primary Examiner—H. Grant Skaggs
Attorney, Agent, or Firm—Sprung, Horn, Kramer & Woods

[57] ABSTRACT

A machine for applying pellets and powder, especially micropellets, to the soil, incorporating, first, a reservoir with outlets, second, ridge wheels that are rotated by a drive shaft at varying rates and the distribute uniform volumes of the material flowing out of the reservoir through the outlets into exit pipes that communicate with a blower and that have outflow openings, and, third, base plates below the ridge wheels. To ensure uniform application of material that tends to clog up the ridge wheels the machine is provided with scrapers that are intended for cleaning the ridge wheels, that engage the depressions between the ridges, which are positioned one after the other in the sense of rotation, and that are appropriately constructed to scrape the depressions out.

6 Claims, 6 Drawing Figures

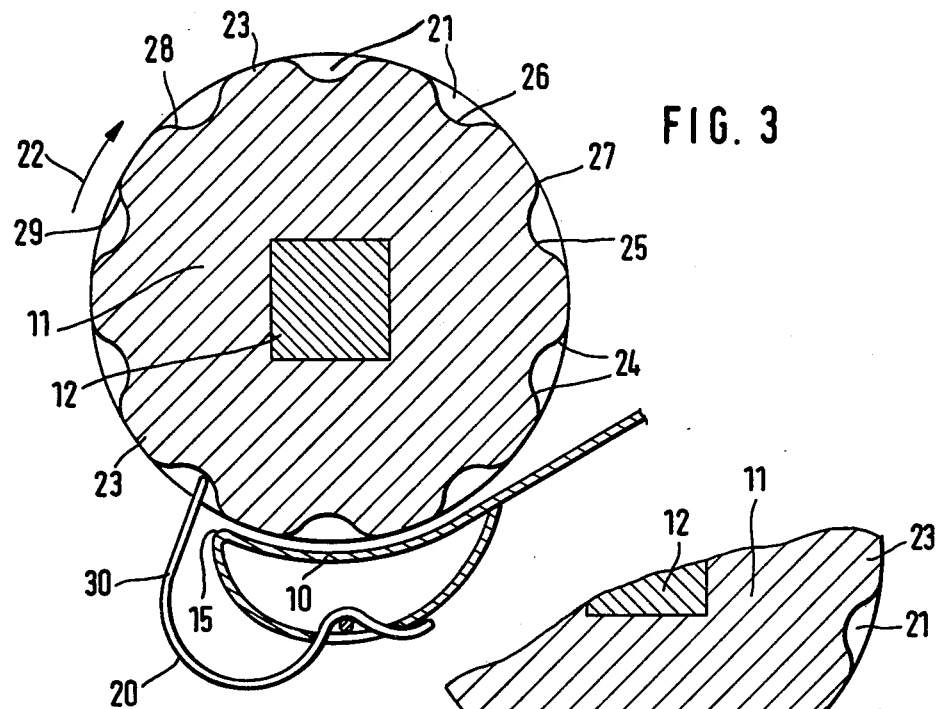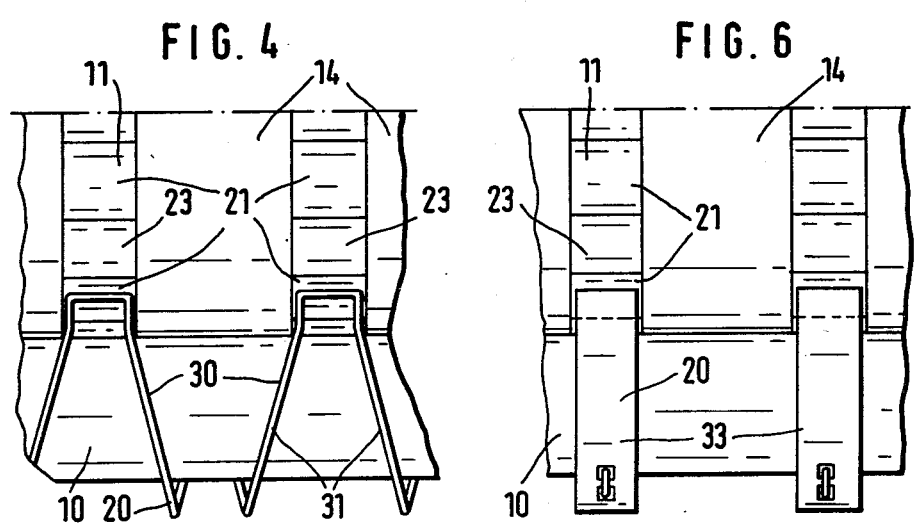

MACHINE FOR APPLYING PELLETS AND POWDER

BACKGROUND OF THE INVENTION

The invention relates to a machine for applying pellets and powder to the soil incorporating, first, a reservoir with outlets, second, ridge wheels that are rotated by a drive shaft at varying rates and that distribute uniform volumes of the material flowing out of the reservoir through the outlets into exit pipes that communicate with a blower and that have outflow openings, and, third, base plates below the ridge wheels.

A machine of this type is known from German Auslegeschrift No. 2 924 625. One particular advantage of such a machine is that it can apply either large volumes of any type of commercial fertilizer per unit of area or extremely small volumes of either micropellets or fertilizer with a high percentage of nitrogen or parasite-control and weed-control agents per unit of area. When micropellets are applied, the machine's conventional ridge wheels are replaced with wheels that have a denser pattern or ridges.

There is, however, one disadvantage to this type of machine. The intervals or depressions between the individual ridges on the ridge wheels can get clogged up, especially when a damp material is being applied, which makes it impossible to distribute the material uniformly. Less and less material gets applied as the intervals get more and more clogged up. If the situation continues, no material at all may get applied.

A device for distributing uniform quantities of pellets or powder is known from German Pat. No. 2 208 834. The advantage of this device is that it incorporates means for cleaning out the intervals between the ridges. It also has a drawback, however. Since the depressions between the ridges, which are positioned one after the other in the sense of rotation do not get scraped out, damp material can also get distributed unevenly from this type of machine.

Still another type of machine for applying pellets and powder, especially micropellets, is known from the Evrard DM 12 prospectus. One advantage of this machine is that it has brushes for cleaning the ridge wheels. The drawback to this type of machine is that the brushes themselves get clogged up, especially when the material being applied is damp. The separate bristles on the brushes tend to stick together, so that, instead of cleaning the ridge wheels, the brushes actually accelerate the clogging up of the intervals between the ridges.

SUMMARY OF THE INVENTION

The object of the invention is to provide an improved machine for applying pellets and powder that will uniformly apply even materials that tend to clog up the ridge wheels on the known types of machine.

This object is achieved by the provision of scrapers that are intended for cleaning the ridge wheels, that engage the depressions between the ridges, which are positioned one after the other in the sense of rotation, and that are appropriately constructed to scrape the depressions out. The indicated means forcibly remove the material that is supposed to get applied to the soil, but that adheres instead to the ridge wheels, from the depressions between the ridges, which are positioned one after the other in the sense of rotation, and transfer it into the exit pipes. These means will preferably engage the intervals between the ridges in the vicinity of the outthrow edges of the base plates.

This ensures distribution of uniform quantities because the material that adheres to the ridge wheels is returned to the exit pipes simultaneously with the material that drops off the ridge wheels.

In another embodiment of the invention, the scrapers are hooks and the hooks are made out of a resilient material such as a leaf spring. The end of each hook may also be bent.

In a further embodiment, the scrapers are U-shaped wires and may be composed of a resilient material or springs may be attached to the scrapers.

In a still further embodiment, the scrapers engage the intervals between the ridges in the vicinity of the offthrow edges of the base plates.

Further, the bottoms of the flanks of the ridges on each wheel merge in a smooth curve into the surface of each cylinder, and the tops of the flanks also curve smoothly.

Additionally, smooth-surfaced fillers may be disposed between the ridge wheels.

The invention will now be described with reference to the drawings, in which

BRIEF DESCRIPTION OF THE DRAWINGS

FIG. 3 is a sectional view of a ridge wheel in accordance with the present invention as seen from the front of the machine, FIG. 4 is a side view of the wheel in FIG. 3, FIG. 5 is a sectional view through part of another wheel in accordance with the present invention as seen from the front of the machine, and FIG. 6 is a side view of the wheel in FIG. 5.

DETAILED DESCRIPTION OF THE INVENTION

Figure 1:
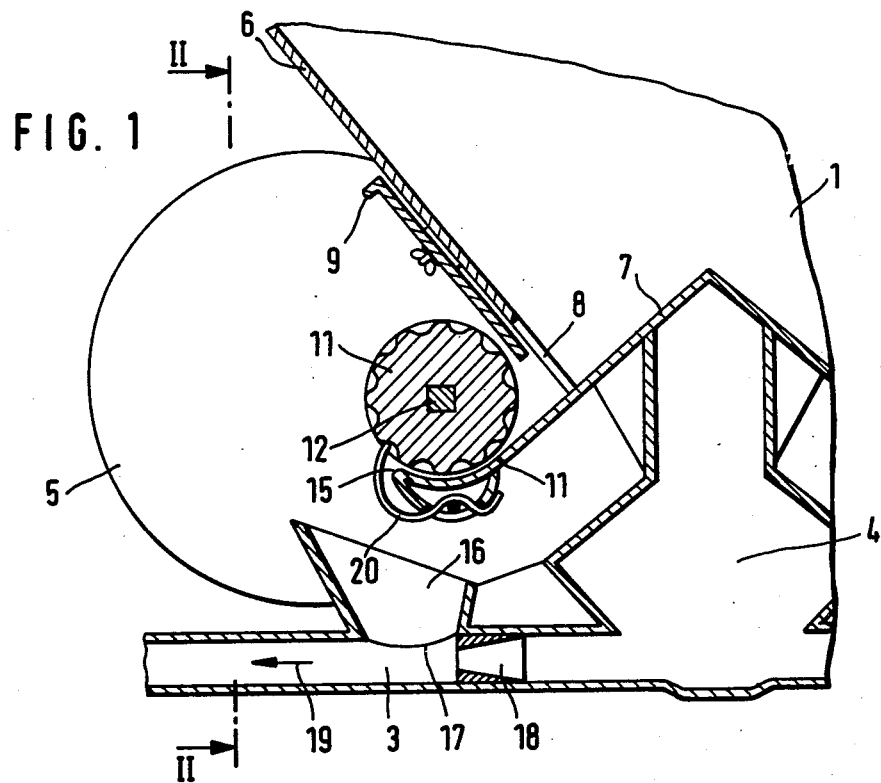
FIG. 1 is a sectional view through part of a machine in accordance with the present invention as seen from the front thereof.
Figure 2:
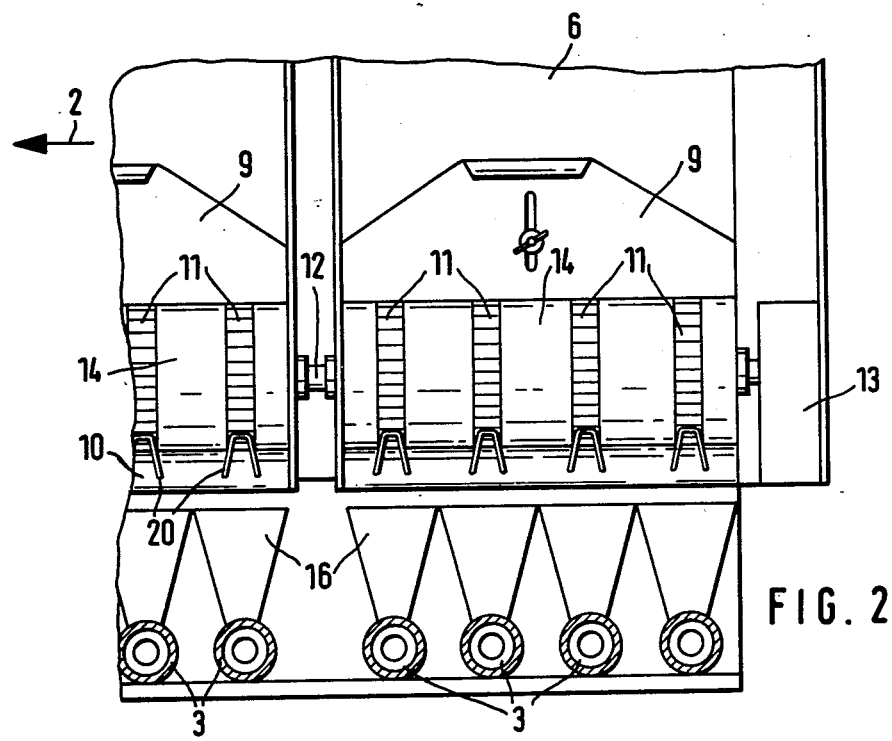
FIG. 2 is a sectional view through part of the same machine along line II—II of FIG. 1.

Referring now to FIGS. 1-4, the machine incorporates a reservoir 1 and exit pipes 3 that extend toward both sides across the direction of travel, which is indicated by the arrow in FIG. 2. Exit pipes 3 are, although this is not illustrated, of different lengths and end in outflow openings as in known designs. Exit pipes 3 communicate with an air channel 4, which extends along the direction 2 of travel. A blower 5 opens into air channel 4.

On both sides of each side wall 6 of reservoir 1 and just above its peaked floor 7 is a row of outlets 8 that extends along the direction 2 of travel. Only the outlets 8 on the left side of reservoir 1 are illustrated. Reservoir outlets 8 are divided into groups, each of which can be closed off or opened to different widths by throughput-control slides 9.

Outside reservoir outlets 8 and above base plates 10, which are attached at an angle to reservoir floor 7 and slant outward, are mounted proportioning devices in the form of groups of ridge wheels 11, which can be replaced in a known operation with wheels that have a different pattern of ridges. Ridge wheels 11 are rigidly mounted on seeder-type shafts 12 and can be rotated at various rates by a variable drive 13. Between ridge wheels 11 are mounted smooth-surfaced fillers 14.

Wheels 11 and fillers 14 form a micropellet cylinder as illustrated in the drawings.

Below the downward sloping offthrow edge 15 of each base plate 10 are intake hoppers 16, each of which is mounted flush with the material intake 17 of one exit pipe 3. There is a nozzle-like contraction upstream of the material intake 17 in each exit pipe 3 to help generate suction below the intake.

The material to be applied flows out of reservoir 1 through outlets 8 and is distributed in uniform volumes by ridge wheels 11 along the offthrow edge 15 of each base plate 10, whence it drops into intake hoppers 16. At this point it becomes affected by the suction, which draws it through material intakes 17 into exit pipes 3, whence it is forced by the air current generated by blower 5 in the direction indicated by arrow 19 out of the outflow openings of exit pipes 3, becoming uniformly distributed over the soil.

Scrapers 20 for cleaning ridge wheels 11 are mounted on base plates 10. These scrapers 20 engage the depressions 21 between ridges 23, which are positioned one after the other in the sense 22 of rotation, and scrape them out.

The bottoms 25 of the flanks 24 of ridges 23 merge in a smooth curve into the surface 26 of each cylinder, and the tops 27 of the flanks also curve smoothly, so that scrapers 20 can easily follow the contour of ridge wheels 11. The front of scrapers 20, which is the part that engages ridge wheels 11, is rounded off to inhibit wear on ridges 23.

Only the front of scrapers 20 engage ridge wheel 11 or ridges 23, cleaning both the front 28 and the rear 29, in relation to the sense of rotation, of each. Any material that gets into and adheres in the depressions 21 between ridges 23 will get scraped off and transferred into exit pipes 3.

To ensure especially precise distribution, scrapers 20 engage intervals 21 between ridges 23 in the vicinity of the offthrow edges 15 of the base plates 10.

The scrapers 20 illustrated in FIGS. 1 through 4 are made of wires 30 of a resilient material bent into the shape of a U. The front end of U-shaped scrapers 20 are approximately as wide as ridges 23. Wires 30 spread apart, their legs separating toward the back, to prevent the material being distributed from falling onto the scrapers.

It will be appreciated that the instant specification and claims are set forth by way of illustration and not limitation, and that various modifications and changes may be made without departing from the spirit and scope of the present invention.

What is claimed is:

1. In a machine for applying material in the form of pellets and powder to the soil, having a reservoir with outlets for holding the material to be applied, wheels having ridges on the peripheral surface thereof and with base plates therebelow and rotated by a drive shaft at varying rates for distributing uniform volumes of the material, flowing out of the reservoir through the outlets, into exit pipes that communicate with a blower and that have outflow openings, the improvement wherein the ridges curved smoothly and are disposed one after the other in the direction of rotation of the wheels and the base plates are disposed at the bottom of the wheels, each base plate having an arcuate portion configured in accordance with the circumference of the wheel and disposed adjacent to the bottom of the wheel and further comprising scraping means disposed in engagement with the wheels for scraping out the depressions between the ridges of the wheels, the scraping means comprising U-shaped bent wires each having a front end and two legs and wherein the front end only is in contact with the wheel ridges and continuously follows the contour of the wheels to extend to the bottom of the depressions during rotation of the wheels.

2. The machine according to claim 1, wherein the base plates have offthrow edges at the leading edge thereof in the direction of rotation of the wheels and the U-shaped wire engages the ridges of the wheels in the vicinity of the offthrow edges of the base plates.

3. The machine according to claim 1, wherein the bottoms of the flanks of the ridges on each wheel merge in a smooth curve into the surface of each cylinder, and the tops of the flanks also curve smoothly.

4. The machine according to claim 1 or 3, wherein each U-shaped wire comprises a resilient material.

5. The machine according to claim 1 or 3, wherein the scraping means comprises a spring connecting each U-shaped wire to the base plates to bias same into engagement with the wheels.

6. The machine according to claim 1, further comprising smooth-surfaced fillers between the wheel ridges.

* * * * *